(12) United States Patent
Hsu et al.

(10) Patent No.: US 7,190,454 B2
(45) Date of Patent: Mar. 13, 2007

(54) AUTOMATIC POWER CONTROLLER

(75) Inventors: Tse-Hsiang Hsu, Hsinchu (TW);
Pao-Ping Ma, Hsin Chu (TW)

(73) Assignee: Mediatek Inc., Hsin-chu (TW)

( * ) Notice: Subject to any disclaimer, the term of this patent is extended or adjusted under 35 U.S.C. 154(b) by 353 days.

(21) Appl. No.: 10/803,973

(22) Filed: Mar. 19, 2004

(65) Prior Publication Data
US 2004/0188591 A1   Sep. 30, 2004

(30) Foreign Application Priority Data
Mar. 26, 2003 (TW) .............................. 92107029 A

(51) Int. Cl.
*G01B 11/00* (2006.01)
(52) U.S. Cl. .................. 356/394; 250/205; 327/514
(58) Field of Classification Search ............... 250/205; 327/514; 356/394, 213, 218, 221, 229, 230
See application file for complete search history.

(56) References Cited
U.S. PATENT DOCUMENTS 4,095,098 A * 6/1978 Looper ...................... 250/205
5,134,273 A * 7/1992 Wani et al. .................. 250/205
5,923,427 A * 7/1999 Dong .......................... 356/623

* cited by examiner

Primary Examiner—Hoa Pham
Assistant Examiner—Tri Ton
(74) Attorney, Agent, or Firm—Birch, Stewart, Kolasch & Birch, LLP

(57) ABSTRACT

An automatic power controller includes a photo detector for detecting the output power of the laser light source and generating a detection signal, a comparator for comparing the detection signal with a reference signal and outputting a comparison signal, a signal source for providing the reference signal with different voltages representing different output power levels of the laser light source to be set, and a gain-adjustable amplifier for receiving the comparison signal and generating an output signal. The gain of the gain-adjustable amplifier is adjusted so that the voltage difference between the steady-state voltage of the comparison signal and the voltage of the reference signal is kept substantially unchanged regardless of the output power of the laser light source, the occurrence of charging/discharging the capacitor in the comparator is reduced. Therefore the automatic power controller can rapidly reach its new steady state while changing the laser output power.

9 Claims, 7 Drawing Sheets

AUTOMATIC POWER CONTROLLER

This Non-provisional application claims priority under 35 U.S.C. § 119(a) on patent application Ser. No(s). 092107029 filed in Taiwan on Mar. 26, 2003, the entire contents of which are hereby incorporated by reference.

BACKGROUND OF THE INVENTION

1. Field of the Invention

The invention relates to an automatic power controller for a laser light source in an optical disk drive, and more particularly to an automatic power controller for the laser light source in an optical disk drive, which is capable of rapidly changing and stabilizing the output power of the laser light source.

2. Description of the Related Art

FIG. 1 illustrates an architecture diagram of a conventional automatic power controller for a laser light source in an optical disk drive. Referring to FIG. 1, the conventional automatic power controller 10 includes a signal source 11, a comparator 12, a drive unit 13, a photo detector 14, and a laser light source (for example, a laser diode) 15. The drive unit 13 receives a comparison signal V2 of the comparator 12 and then generates a drive signal to drive the laser light source 15. The laser light source 15 generates the laser beam with specified power level. The photo detector 14 detects the power of the laser beam emitted from the laser light source 15 and generates a detection signal V3 representing the detected laser output power.

In this architecture, the comparator 12 includes an Operational (OP) amplifier 121, resistors R1 and R2, and a capacitor C. The detection signal V3 is transmitted to a negative input terminal of the OP amplifier 121 via the resistor R1, while a reference signal V1 outputted from the signal source 11 is transmitted to a positive input terminal of the OP amplifier 121. The negative input terminal of the OP amplifier 121 is coupled to the output terminal via the resistor R2 and the capacitor C which are in parallel connection. The architecture diagram of the automatic power controller 10 of FIG. 1 only shows the basic architecture, and an additional amplifier may be disposed between the comparator 12 and the drive unit 13 or between the photo detector 14 and the comparator 12 in the actual design. Moreover, the photo detector 14 could be a front monitor diode (FMD).

Suppose the automatic power controller 10 wants to change the output power of the laser light source 15 from power level Pa to power level Pb, the signal source 11 should change the voltage of the reference signal V1 from V1a to V1b. Under this case, FIGS. 2A to 2D respectively show the detection signal V3 of the photo detector 14, the comparison signal V2 of the OP amplifier 121, and the voltage Vc across the capacitor C. As show in FIG. 2A, the voltage of the reference signal V1 is changed from V1a to V1b. As shown in FIG. 2B, the voltage of the comparison signal V2 of the OP amplifier 121 is changed from V2a to V2c and then to V2b. As shown in FIG. 2C, the voltage of the detection signal V3 of the photo detector 14 is changed from V3a to V3c and then to V3b. As shown in FIG. 2D, the voltage of the voltage Vc across the capacitor C is changed from Vca to Vcb. It is found that as the reference signal V1 being changed, the voltage Vc across the capacitor C is also changed accordingly. As shown in FIG. 2B and FIG. 2D, the comparison signal V2 of the OP amplifier 121 will not reach its steady state until the capacitor C finishes the action of charging/discharging. In addition, in order to achieve better noise immunity of the comparison signal V2 of the OP amplifier 121, the RC constant of the OP amplifier 121 is usually configured to be large enough. However, such a design will then result in that the automatic power controller 10 needs a long time to reach the steady state which is found to frequently cause the servo control in the optical disk drive to fail. For example, the seeking error signal may be out of control range.

FIG. 3 illustrates an architecture diagram of another conventional automatic power controller for a laser light source in an optical disk drive. Referring to FIG. 3, in addition to a second signal source 32, a comparator 12, a drive unit 13, a photo detector 14, and a laser light source (for example, a laser diode) 15, the automatic power controller 30 further includes a first signal source 31, a control unit 33, and two switches SW1 and SW2. The comparator 12 includes an OP amplifier 121, resistors R1 and R2, and a capacitor C. The automatic power controller 30 utilizes the first signal source 31 to generate a control voltage signal, and the control unit 33 to switch the switch SW1 when laser light output power is changed so as to let the control voltage signal to be fed to the drive unit 13 at the beginning of each laser light power changing progress.

Therefore, the drive unit 13 may rapidly generate a correct drive signal to achieve desired output power level of the laser light source 15. Next, the automatic power controller 30 utilizes the switch SW2 to directly output the high voltage (Vcc) or the ground voltage to the OP amplifier 121 at the beginning of each laser light power changing progress so as to make the capacitor C charge/discharge rapidly. Finally, the automatic power controller 30 utilizes the control unit 33 to detect the output voltage of the OP amplifier 121 and the output voltage of the first signal source 31. When both of the output voltages are close to each other, the states of the switches SW1 and SW2 are switched back such that the automatic power controller 30 is switched back to the normal operation mode. Although the automatic power controller 30 may rapidly generate the desired laser output power and stabilize the OP amplifier 121, an extra control unit 33 has to be utilized to detect the output voltage of the OP amplifier 121 and the output voltage of the first signal source 31, and the operations of the switches SW1 and SW2 have to be controlled carefully. For practical implementation, such a design is too complicated.

SUMMARY OF THE INVENTION

In view of the above-mentioned problems, an object of the invention is to provide an automatic power controller capable of rapidly changing and stabilizing the output power of the laser light source.

To achieve the above-mentioned object, the invention provides an automatic power controller, which includes a photo detector for detecting an output power of a laser light source and generating a detection signal, a signal source for providing a reference signal, a comparator for comparing the detection signal with the reference signal and outputting a comparison signal, a gain-adjustable amplifier for receiving the comparison signal and generating an output signal, and a drive unit for receiving the output signal and generating a drive signal for driving the laser light source The comparator further includes an OP amplifier for generating the comparison signal and having an output terminal for outputting the comparison signal, a first resistor disposed between the photo detector and a first input terminal of the OP amplifier, and a capacitor coupled between the first input terminal and the output terminal of the OP amplifier. By adjusting the gain of the gain-adjustable amplifier for different output power of the laser light source, the automatic power controller maintains substantially the same voltage difference between the comparison signal and the reference signal regardless the changing of the output power of the laser light source.

The comparator could also implemented by using a gm-C (transconductor-capacitor) integrator for receiving the detection signal and the reference signal and generating the comparison signal at its output terminal, and a capacitor coupled between the output terminal of the gm-C integrator and the ground. The automatic power controller in the invention maintains substantially the same voltage difference between the comparison signal and the reference signal regardless the changing of the output power of the laser light source.

By making the voltage difference between the comparison signal and the reference signal substantially the same, the voltage Vc across the capacitor C will then be kept substantially unchanged, which in turn reduces the occurrence of charging/discharging the capacitor C, therefore the time for the automatic power controller to reach its new steady state is shortened while changing the laser output power.

DETAILED DESCRIPTION OF THE INVENTION

The automatic power controller for the laser light source in an optical disk drive of the present invention will be described with reference to the accompanying drawings.

Figure 4:
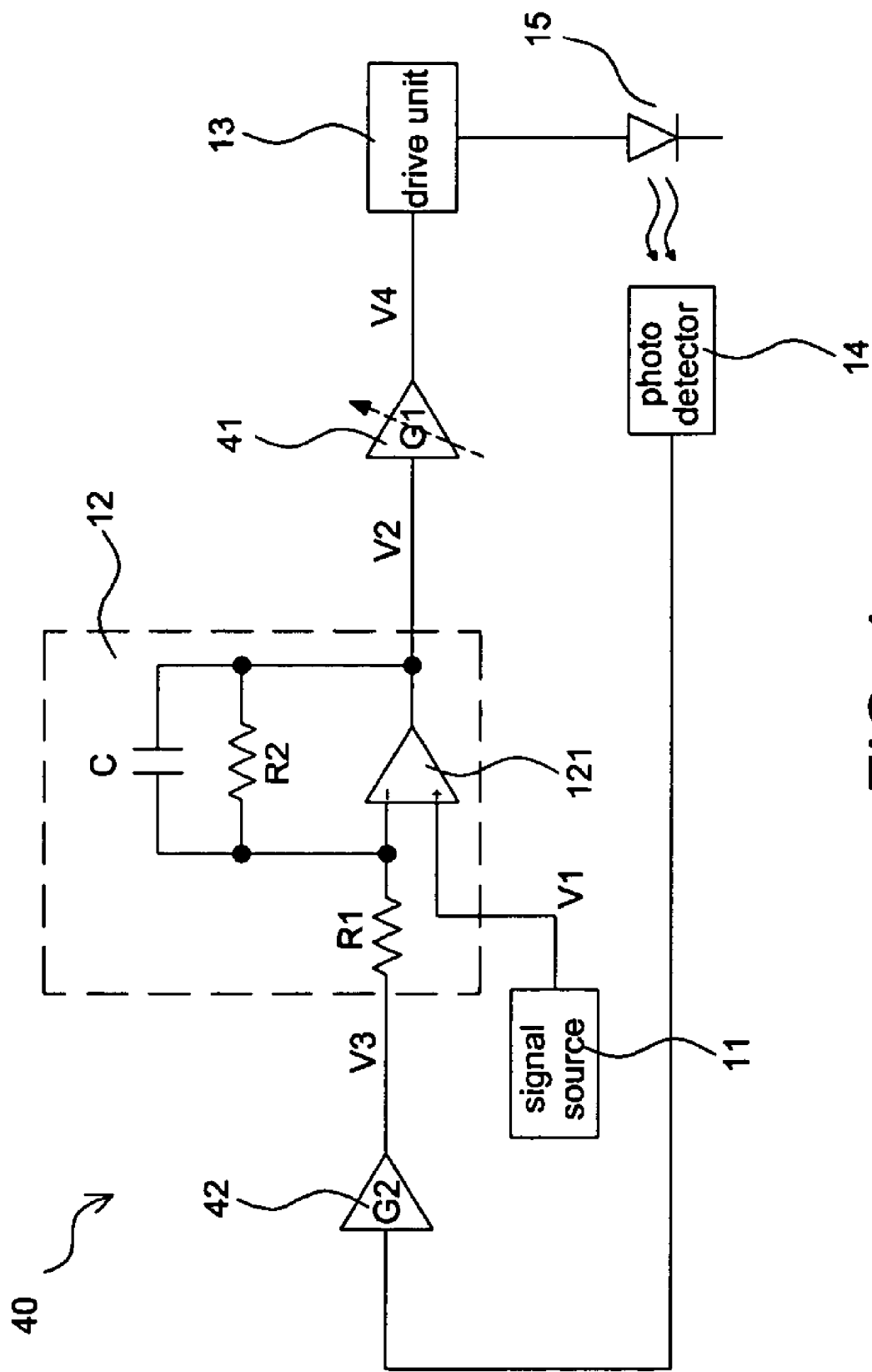
FIG. 4 illustrates an architecture diagram of an automatic power controller for a laser light source in an optical disk drive according to a first embodiment of the invention.

FIG. 4 illustrates an architecture diagram of an automatic power controller for a laser light source in an optical disk drive according to a first embodiment of the present invention. Referring to FIG. 4, the automatic power controller 40 includes a signal source 11, a comparator 12, a drive unit 13, a photo detector 14, and a laser light source (for example, a laser diode) 15. The signal source 11 could be a digital-to-analog converter, or the like, for transferring a digital data (not shown in the figure) to an analog reference signal V1. The automatic power controller 40 further includes a gain-adjustable amplifier (G1) 41 disposed between the comparator 12 and the drive unit 13 and a front amplifier (G2) 42 disposed between the photo detector 14 and the comparator 12. The gain-adjustable amplifier 41 is regarded as a voltage adjusting unit. The comparator 12 includes an OP amplifier 121, resistors R1 and R2, and a capacitor C, wherein the output signal level of the OP amplifier 121 depends on the voltage across the capacitor C. Note that, as familiar with those skilled in the art, the resistor R2 in the comparator 12 may be omitted without harming the basic function of the comparator.

The object of using the gain-adjustable amplifier 41 in this automatic power controller 40 is to adjust its gain so as to maintain the same voltage across the capacitor C in the comparator 12 so as to reduce the occurrence of charging/discharging the capacitor C when the laser output power is changed to a different level. As a result, the time for the automatic power controller 40 to reach its new steady state is shortened while changing the laser output power. Based on this principle, the voltage difference between the voltage of the reference signal V1 and the steady-state voltage of the comparison signal of the OP amplifier 121 should be kept substantially unchanged when the laser output power is changed to a different level. Besides the above mentioned advantage, the automatic power controller 40 of the invention can also prevent the OP amplifier 121 from reaching the saturated state due to a too small/large OP amplifier output signal.

Figure 1:
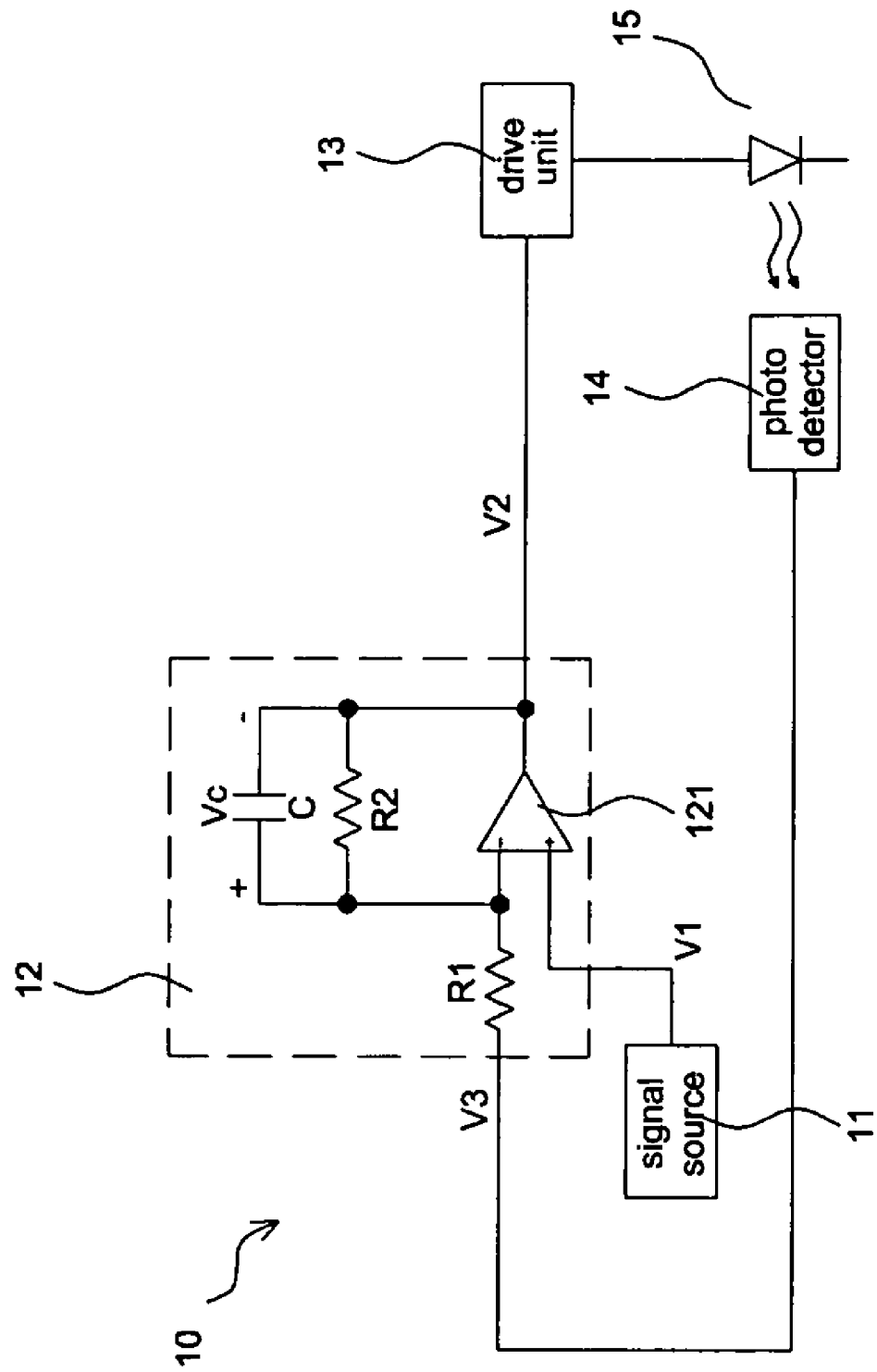
FIG. 1 illustrates an architecture diagram of a conventional automatic power controller for a laser light source in an optical disk drive.
Figure 2A:
FIG. 2A shows the reference signal V1 of the signal source in FIG. 1.
Figure 2B:
FIGS. 2B to 2D respectively show the detection signal V3 of the detector, the comparison signal V2 of the OP amplifier, and the voltage Vc across the capacitor C, given the reference signal V1 shown in FIG. 2A.
Figure 2C:
Figure 2D:
Figure 3:
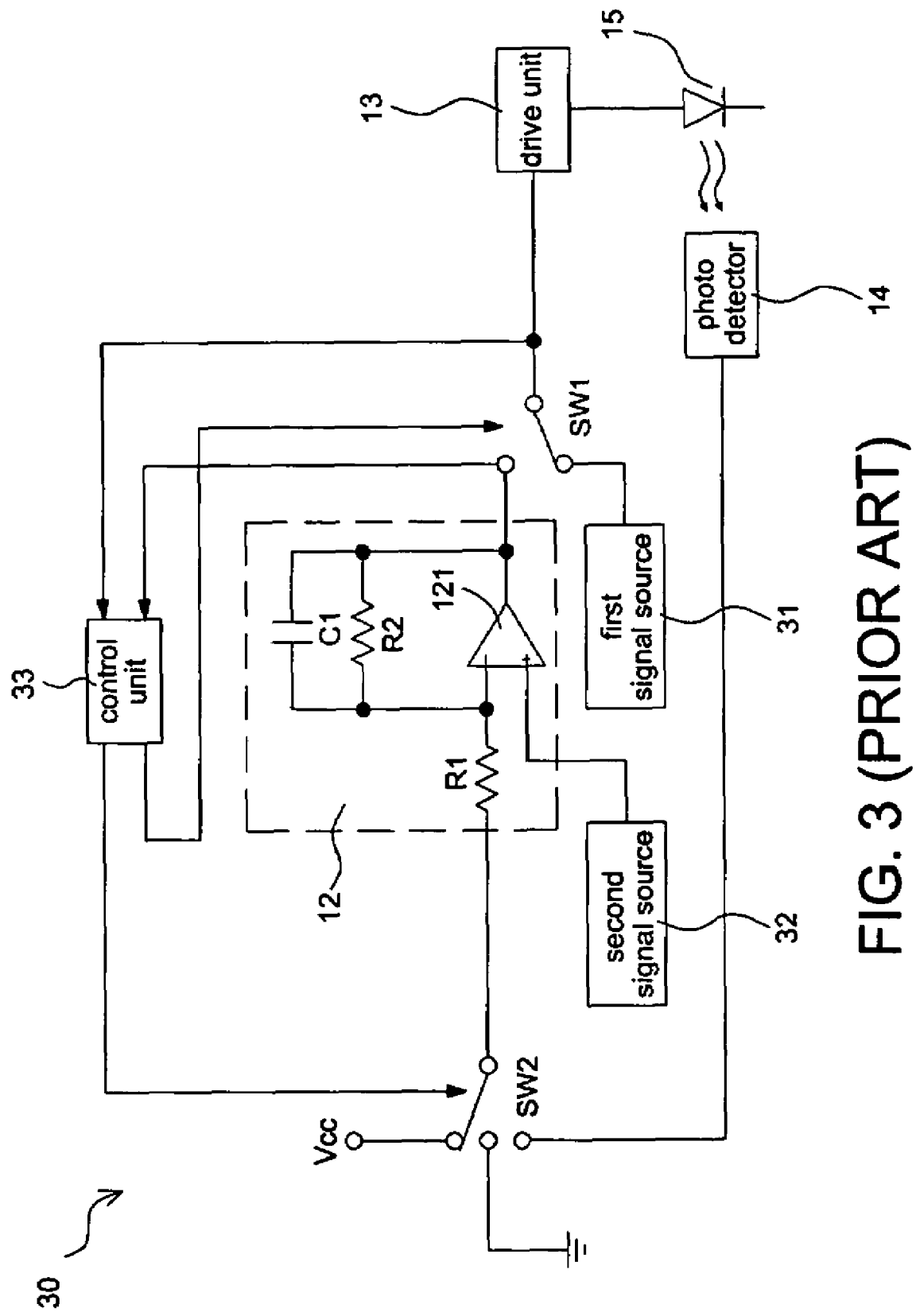
FIG. 3 illustrates an architecture diagram of another conventional automatic power controller for a laser light source in an optical disk drive.

When the power of the laser light source is necessary to be changed from a first output power (e.g., the power in the reading state) Pa to the second output power (e.g., the power in the writing state) Pb, the automatic power controller 40 will firstly changes the voltage of the reference signal V1 of the signal source 11 from, say, V1$a$ to V1$b$. For the sake of clarity, some notations are introduced as follows. Suppose, the output voltage of the comparator 12 is then changed from V2$a$ to V2$b$, and the front amplifier 42 generates a voltage changed from V3$a$ to V3$b$. Meanwhile, the gain of the gain-adjustable amplifier 41 is changed from G1$a$ to G1$b$, and its output voltage V4$a$ to V4$b$. Recall that the reason why the automatic power controller 10 shown in FIG. 1 needs a longer time to reach the steady state is that the output voltage shift (V2$b$–V2$a$) of the comparator 12 is not equal to the output voltage shift (V1$b$–V1$a$) of the reference signal. Such unequal voltage shifts mean that the voltage across the capacitor C will be changed when the laser output power is changed. In order to solve the problem, the invention utilizes the gain-adjustable amplifier 41 to amplify the output voltage of the comparator 12 with proper gains for different laser power output, such that the steady-state voltage difference between the comparison signal V2 and the reference signal V1 are kept substantially unchanged, or in an even simpler way, the steady-state voltage of the comparison signal V2 is equal to the voltage of the reference signal V1, regardless the output power level of the laser light source. By this way, the voltage across the capacitor C in the comparator 12 is kept substantially unchanged to reduce the occurrence of charging/discharging the capacitor C.

As an example, by letting the steady-state voltage of the comparison signal V2 equal to the voltage of the reference signal V1, the OP amplifier 121 of the comparator 12 will be free from reaching the saturated state due to a too high/low OP amplifier output signal level. In addition, because the capacitor C does not have to be additionally charged/discharged when changing the laser output power, the power switching speed thereof may be greatly enhanced.

The way for setting the gain of the gain-adjustable amplifier 41 for different laser power outputs is represented as:

$$G1a=V4a/V1a, \text{ and}$$

$$G1b=V4b/V1b,$$

wherein it is assumed, as an example, there are two laser output power levels in the application, V4a is a predetermined voltage required by the drive unit 13 for driving a laser light of the first output power level, V4b is a predetermined voltage required by the drive unit 13 for driving a laser light of the second output power level, V1a is a predetermined voltage of the reference signal V1 used to indicate the first laser output power level, and V1b is a predetermined voltage used to indicate the second laser output power level. Accordingly, the G1a and G1b can be obtained in advance. The gain of the gain-adjustable amplifier 41 is set to G1a for the case of first laser output power level; while to G1b for the case of second laser output power level.

Figure 5:
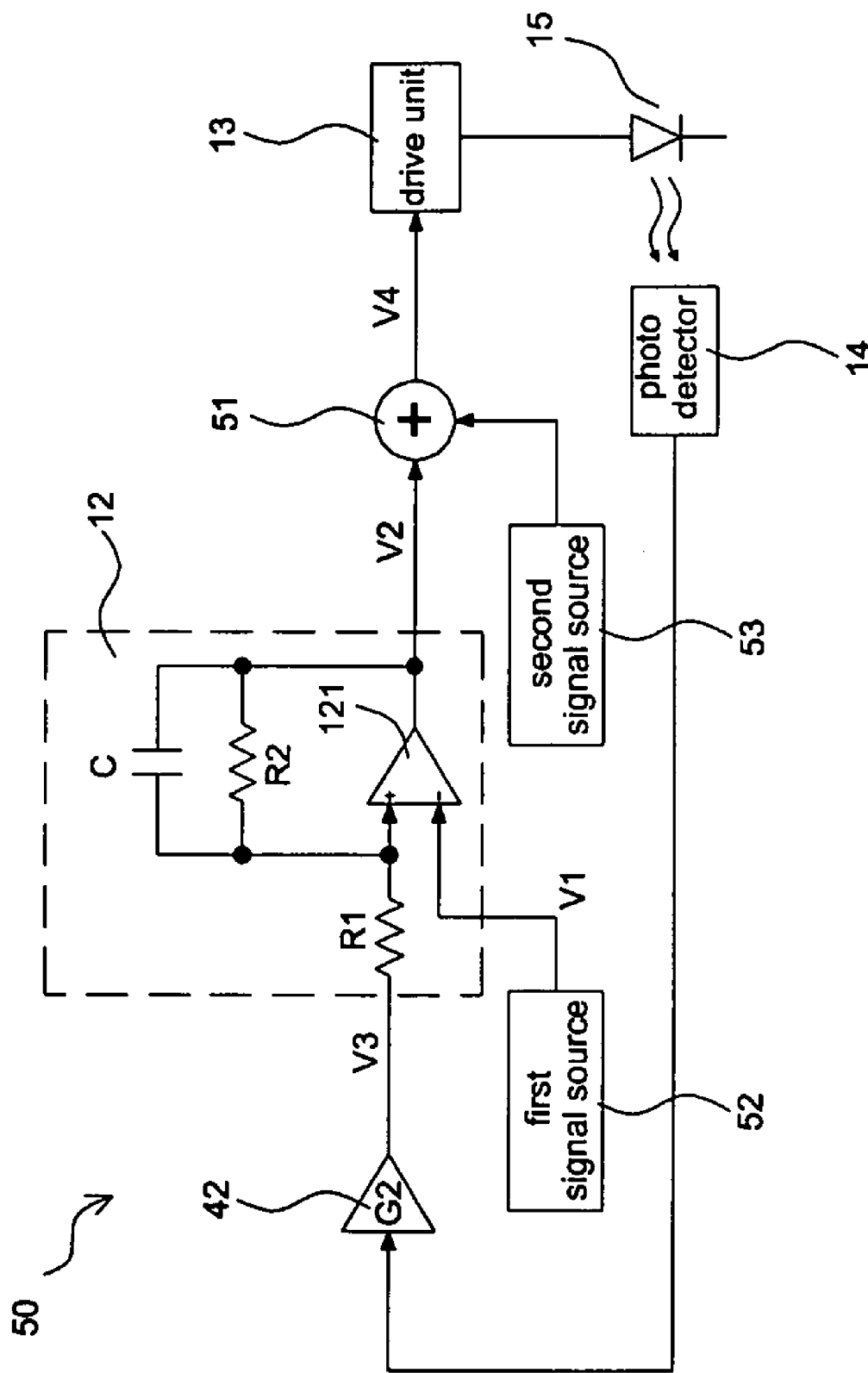
FIG. 5 illustrates an architecture diagram of an automatic power controller for a laser light source in an optical disk drive according to a second embodiment of the invention.

FIG. 5 illustrates an architecture diagram of an automatic power controller for a laser light source in an optical disk drive according to a second embodiment of the present invention. Referring to FIG. 5, in addition to a first signal source 52, a comparator 12, a drive unit 13, a photo detector 14, and a laser light source 15, the automatic power controller 50 further includes an adder 51 disposed between the comparator 12 and the drive unit 13, a second signal source 53, and a front amplifier (G2) 42 disposed between the photo detector 14 and the comparator 12. The adder 51 and the second signal source 53 are regarded as a voltage adjusting unit. The comparator 12 includes an OP amplifier 121, resistors R1 and R2, and a capacitor C. Note that, as familiar with those skilled in the art, the resistor R2 in the comparator 12 may be omitted without harming the basic function of the comparator.

The difference between the automatic power controller 50 of this embodiment and the automatic power controller 40 of the first embodiment is that the second signal source 53 and the adder 51 are utilized to replace the gain-adjustable amplifier 41, and the objects and functions thereof are the same as those of the first embodiment. The automatic power controller 50 of the invention utilizes the second signal source 53 to output different offset voltages for different laser output power level, and utilizes the adder 51 to add the output voltage of the comparator 12 to the specified offset voltage so as to change the voltage outputted to the drive unit 13. Thus, the voltage across the capacitor C of the OP amplifier 121 is kept substantially unchanged. That is, the voltage difference between the output voltage of the first signal source 52 and the output voltage of the OP amplifier 121 is kept substantially the same, regardless of the laser output power level.

Figure 6:
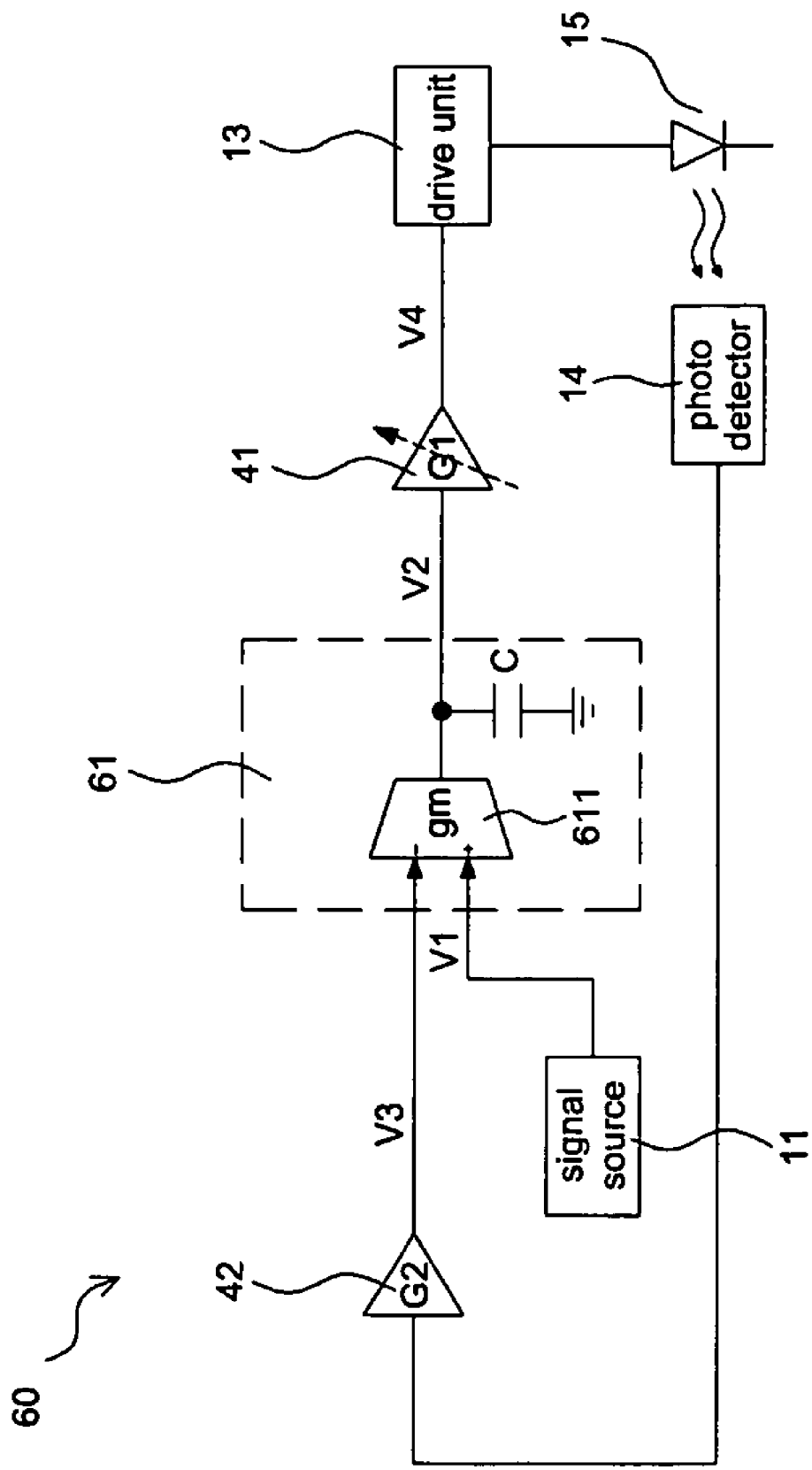
FIG. 6 illustrates an architecture diagram of an automatic power controller for a laser light source in an optical disk drive according to a third embodiment of the invention.

FIG. 6 illustrates an architecture diagram of an automatic power controller for a laser light source in an optical disk drive according to a third embodiment of the present invention. Referring to FIG. 6, the automatic power controller 60 includes a signal source 11, a comparator 61, a drive unit 13, a photo detector 14, a laser light source 15, a gain-adjustable amplifier (G1) 41, and a front amplifier (G2) 42. The difference between the third embodiment and the first embodiment is that the comparator 12 includes a gm-C (transconductor-capacitor) integrator 611 and a capacitor C, wherein the output signal level of the gm-C integrator 611 depends on the voltage across the capacitor C and, actually, is just the voltage across the capacitor C. The advantage of utilizing the gm-C integrator 611 and the capacitor C is that the number of I/O pin can be decreased by one as compared with that in the first embodiment shown in FIG. 4. Like the OP amplifier, the gm-C integrator also functions as a comparator, but its output signal is of current type and its output terminal has a high impedance. A capacitor is coupled between the output terminal thereof and the ground and functions as an integrator. The operation principle of the embodiment is the same as that of the first embodiment: that is, to maintain the same voltage across the capacitor C in the gm-C integrator 611. Based on this principle, the way for setting the gain of the gain-adjustable amplifier 41 for different laser power outputs is represented as:

$$G1a=V4a/V2^*, \text{ and}$$

$$G1b=V4b/V2^*,$$

wherein it is assumed, as an example, there are two laser output power levels in the application, V4a is a predetermined voltage required by the drive unit 13 for driving a laser light of the first output power level, V4b is a predetermined voltage required by the drive unit 13 for driving a laser light of the second output power level, V2* is a predetermined voltage value. Accordingly, the G1a and G1b can be obtained in advance. The gain of the gain-adjustable amplifier 41 is set to G1a for the case of first laser output power level; while to G1b for the case of second laser output power level.

Note that, the comparator 12 of the automatic power controller 50 of the second embodiment of FIG. 5 may also be changed to the architecture of the comparator 61 of FIG. 6 so that necessary I/O pin can be reduced.

Figure 7:
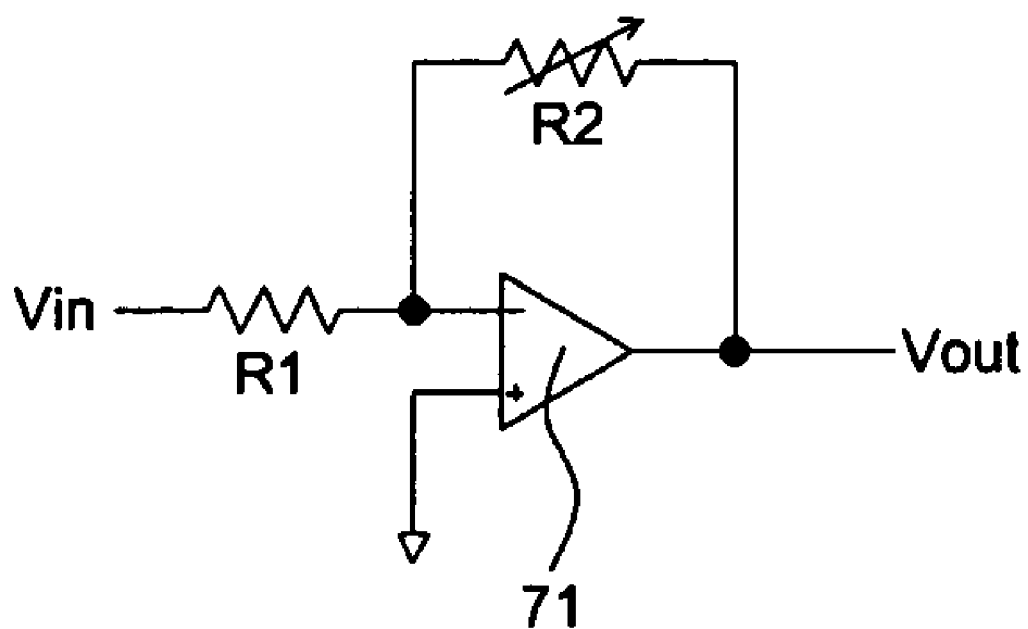
FIG. 7 illustrates an embodiment of the gain-adjustable amplifier.

FIG. 7 illustrates an embodiment of the gain-adjustable amplifier. Referring to FIG. 7, the gain-adjustable amplifier 70 includes an OP amplifier 71, a resistor R1, and a variable resistor R2, wherein the variable resistor R2 is coupled between a negative input terminal and an output terminal of the OP amplifier 71. If the input signal Vin is coupled to the negative input terminal of the OP amplifier 71 via the resistor R1, and a positive input terminal of the OP amplifier 71 is grounded, the output voltage of the OP amplifier 71 is: Vout=Vin*(−R2/R1). Consequently, the gain of the amplifier 70 is adjusted by varying the resistance value of the variable resistor R2.

The automatic power controller of the invention utilizes the gain-adjustable amplifier to maintain substantially the same voltage difference between the comparison signal of the comparator and the reference signal of the signal source regardless of the laser output power level. As a result, the change of the laser output power will need almost no charging/discharging of the capacitor in the comparator, and the time for the automatic power controller to reach the new steady state is shortened accordingly while changing the laser output power. Moreover, because the automatic power controller of the invention needs neither extra control unit for detecting the output voltage of the comparator, nor extra switch circuit for switching the signals fed to the drive unit, the architecture of the automatic power controller of the invention becomes simpler as compared with the conventional design.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An automatic power controller, which automatically controls an output power of a laser light source in an optical disk drive, the automatic power controller comprising:
   a photo detector for detecting the output power of the laser light source and generating a detection signal;
   a first signal source for providing a reference signal having different voltage values representing different output power levels of the laser light source;
   a comparator having a capacitor for comparing the detection signal with the reference signal and outputting a comparison signal depending on the voltage across the capacitor;
   a voltage adjusting unit for generating an output signal according to the comparison signal; and
   a drive unit for receiving the output signal of the gain-adjustable amplifier and generating a drive signal for driving the laser light source;
   wherein the voltage adjusting unit is employed such that the voltage across the capacitor is kept substantially unchanged regardless of the output power level of the laser light source.

2. The automatic power controller according to claim 1, further comprising a front amplifier disposed between the photo detector and the comparator for amplifying the detection signal.

3. The automatic power controller according to claim 1, wherein the first signal source is a digital-to-analog converter.

4. The automatic power controller according to claim 1, wherein the comparator further comprises:
   an OP amplifier having a first input terminal, a second input terminal and an output terminal for receiving the detection signal and the reference signal, respectively, and outputting the comparison signal; and
   a first resistor coupled between the photo detector and the first input terminal of the OP amplifier.

5. The automatic power controller according to claim 4, wherein the capacitor coupled between the first input terminal of the OP amplifier and the output terminal of the OP amplifier.

6. The automatic power controller according to claim 1, wherein the comparator further comprises
   a gm-C integrator having a first input terminal, a second input terminal and an output terminal and an input terminal for receiving the detection signal and the reference signal, respectively, and outputting the comparison signal.

7. The automatic power controller according to claim 6, wherein the capacitor coupled between the output terminal of the gm-C integrator and the ground.

8. The automatic power controller according to claim 1, wherein the voltage adjusting unit is a gain-adjustable amplifier for amplifying the comparison signal with different gains at different output power levels of the laser light source.

9. The automatic power controller according to claim 1, wherein the voltage adjusting unit comprises:
   a second signal source for providing an offset signal with different voltage at different output power levels of the laser light source; and
   an adder for adding the comparison signal and the offset signal and generating an output signal.

* * * * *